March 13, 1928.  1,662,639
R. W. DISBRO
ENDLESS SCREEN BELT AND METHOD OF MAKING SAME
Filed May 20, 1925    2 Sheets-Sheet 1

INVENTOR.
Roger W. Disbro
BY
ATTORNEYS.

March 13, 1928. 1,662,639
R. W. DISBRO
ENDLESS SCREEN BELT AND METHOD OF MAKING SAME
Filed May 20, 1925 2 Sheets-Sheet 2
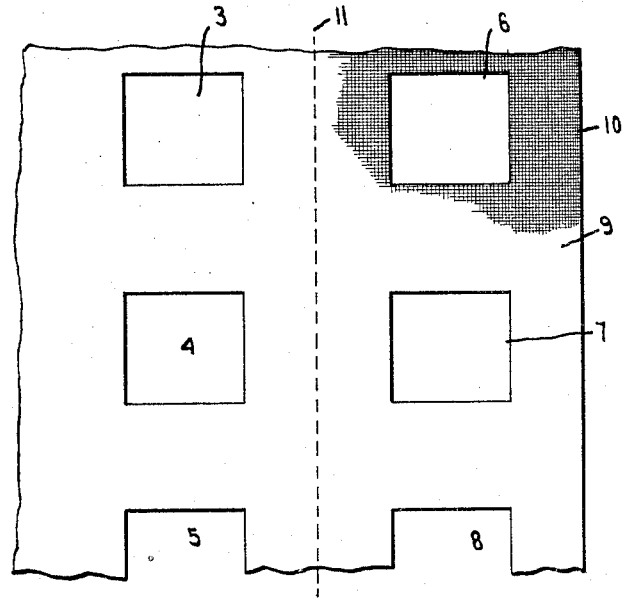
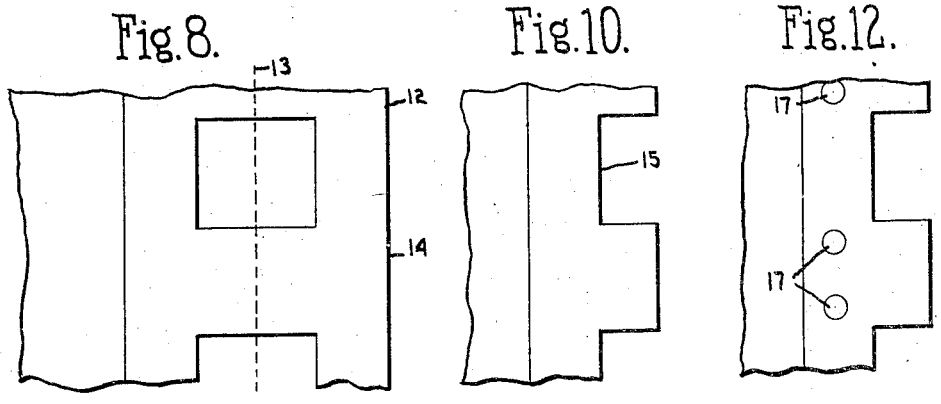
INVENTOR.
Roger W. Disbro
BY
ATTORNEYS.

Patented Mar. 13, 1928.

1,662,639

UNITED STATES PATENT OFFICE.

ROGER W. DISBRO, OF CLEVELAND HEIGHTS, OHIO, ASSIGNOR TO THE W. S. TYLER COMPANY, OF CLEVELAND, OHIO, A CORPORATION OF OHIO.

ENDLESS SCREEN BELT AND METHOD OF MAKING SAME.

Application filed May 20, 1925. Serial No. 31,658.

The present invention relates to an endless screen belt and the method of making same and is particularly directed to the provision of a continuous woven wire screen in the form of an endless belt, which may be of the general type employed in paper making for the drying of the pulp. One of the principal objects of the invention is the provision of a belt of this character which may be made in a single strip and shall be provided with means for securing the ends together in such a way that no objectionable defect in the paper sheet formed thereon will be produced by reason of this joint. A further object of this invention is the provision of a new and improved method for rapidly and economically forming the joining ends of such a strip. To the accomplishment of the foregoing and related ends, said invention, then, consists of the means hereinafter fully described and particularly pointed out in the claims.

The annexed drawings and the following description set forth in detail one method and one product exemplifying my invention, such disclosed procedure and product constituting, however, but one of various applications of the principles of my invention.

In said annexed drawings:—

Figure 1:
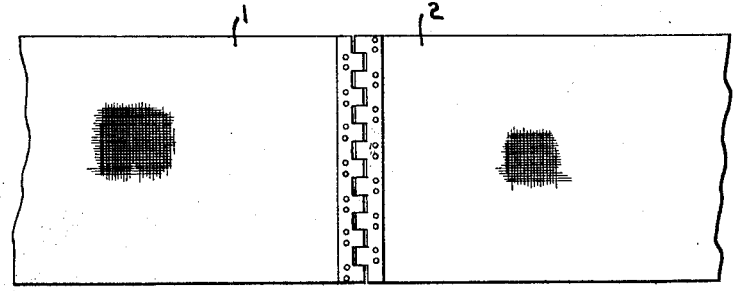
Figure 2:
Figure 3:
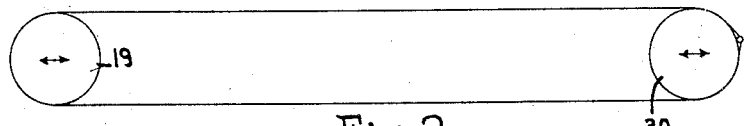
Figure 4:
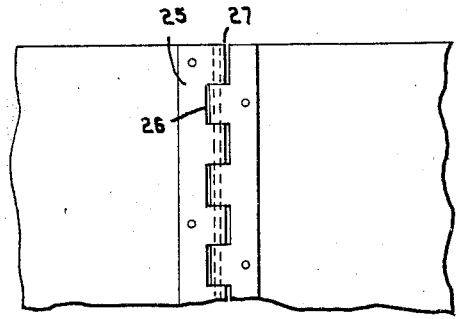
Figure 5:

Fig. 1 is a plan view of a portion of a woven wire belt showing means for joining the adjacent ends thereof; Fig. 2 is a side elevation of the same; Fig. 3 is a side elevation more or less diagrammatic of the belt in position on the operating rolls; Fig. 4 is a plan view of a modification of the joining means; Fig. 5 is an end elevation of the belt of Fig. 4; Fig. 6 is a plan view of the end of a woven wire screen preliminarily formed by my improved method to produce a suitable edge portion for joining to the edge portion of the other end of the belt; Fig. 7 is a side view of the woven wire screen of Fig. 6; Fig. 8 is a plan view of the screen of Figs. 6 and 7 after the next step or operation in the method of forming; Fig. 9 is a side elevation of the same; Fig. 10 is a plan view of the screen of Fig. 8 after the next operation; Fig. 11 is a side elevation of the same; and Fig. 12 is a plan view of the completely formed end of the screen.

Woven wire screen cloth of fine mesh is employed in the paper-making industry as a conveyor belt, on to which the pulp may be fed as the belt is operated to permit the pulp to dry and to allow the pulped mass to be spread out thinly and evenly and to mat together to produce a strip of paper which is then removed from the belt and suitably treated to produce the finished product.

Woven wire screen belts used for this purpose are of considerable length, from 50 to 75 feet, and are carried over large rolls at either end of the belt which are rotated to move the belt. The ends of the woven wire screen strip which is made up into the belt are ordinarily laced or woven together by very fine wire threaded through the adjacent meshes of the two end portions by hand in order to produce a strong joint and one which will not be irregular or produce an indentation or groove in the portion of the sheet which is formed over this joint. The juncture must be extremely strong as the belts are placed under a very heavy tension and are subjected to a considerable load from the weight of the wet pulp which is fed upon them.

The foregoing method of producing an endless woven wire belt is entirely satisfactary, but is extremely expensive and requires that upon the removal of a belt the rolls be slipped from its housing and from within the belt. As a belt seldom lasts longer than 30 days, and as the removal of the rolls, which are extremely large and heavy, is a laborious operation, it means that the production of the machine is interrupted for very considerable periods at frequent intervals and that the operation of changing belts is quite expensive. Under certain conditions it is unimportant if a ridge or groove be formed in the paper as the paper board is in some cases quite thick and is merely produced in convenient sized slabs for shipment and reworking into finished and thin paper, and in such cases a belt would be entirely satisfactory if it had joined ends which would permit of its removal from the rolls without displacing the latter. The present invention relates to a belt of this character and to a method which I have devised of forming the ends of the belt to produce a suitable removable joint between the ends of the woven wire strip.

My method briefly stated consists in forming a series of suitably positioned openings adjacent to the two ends of the strip which is to be formed into a belt, then rebending upon itself a portion of each end of this strip to bring preliminarily formed openings into registration and then again rebending this doubled end portion of the strip upon itself to bring the openings into registration upon themselves to produce a series of cut-out portions along either edge of the strip which are arranged in alternated or staggered relation and which, therefore, form a series of loops which will interfit with each other when the ends of the belt are brought together and through which a hinge element or removable fastening rod may be inserted to join these ends and to produce an endless belt.

In Fig. 1 I have shown a belt made by the method briefly outlined above, the belt consisting of woven wire screen cloth of fine mesh which has its ends 1 and 2 formed with a series of loops, such as I have described, arranged in alternating relation and then interfitted to bring the edges of the strips into alignment, after which a hinge member is inserted within these loops. To produce this belt I first form a series of openings 3, 4, 5, 6, 7, 8 and the like in the end portion 9 of the strip of woven wire screen of suitable mesh. The arrangement of the openings is shown in Fig. 6, the series of openings 6, 7 and 8 being arranged parallel with the edge 10 of the strip and placed a predetermined distance therefrom, while the series of openings 3, 4 and 5, which are of the same area and shape as the openings 6, 7 and 8, are arranged in a second row also parallel with the edge of the strip and spaced a predetermined distance from the first series of openings 6, 7 and 8. The edge portion of the strip is then rebent upon itself along the line 11, which is equidistant between the series of openings 3, 4, 5 and 6, 7, 8, thus bringing the opening 6 into registration with the opening 3, the opening 7 into registration with the opening 4, etc. The strip is then in the condition shown in Figs. 8 and 9.

The doubled end portion 12 of the strip is then again rebent upon itself along the line 13, which lies at the center of the registering openings and parallel to the edge 14 of the doubled end 12 to form notches or cut-out portions 15 along the edges 16 of the strip. Between the notches are formed loops, which are shown in Fig. 11 and which consist of two plies of woven wire screen. It will be noticed that the edges 16 of these loops are not flattened down but are, by the method of making already described, but are left somewhat open which greatly facilitates the threading through the loops of the retaining or hinge member. At this point the rear edges of the rebent portions are secured together and to the body of the strip by means of a series of rivets 17 or in any other suitable manner.

The other end of the woven wire screen strip has been similarly formed to produce a series of notches and a series of intermediate loops, but arranged in a staggered relation to those formed in the first end so that the two series of loops may be fitted within each other in the manner shown in Fig. 1 to bring the corresponding edges of the two ends of the strip into perfect registration. A retaining member in the form of a rod 18 is then threaded through the alternating loops and serves as a hinge to complete an extremely flexible and strong joint between these end portions.

The appearance and construction of the finished joint is shown in Fig. 2, and its appearance when the belt is mounted upon rolls 19 and 20 is shown in Fig. 3. It is desirable that the height, that is, the thickness of the joint at its central portion, through the hinge rod 18, does not cause the belt to be stretched as this hinge passes over the rolls a distance greater than is absorbed by the natural resiliency of the screen, as otherwise, of course, the screen will be stretched at every passage of this hinge over one of the rolls and will necessitate a further spacing of the rolls to keep the belt tight, which will be a constant procedure and cause a loose and floppy belt.

If desired, strips 25 of suitable metal may be secured to the edges of the screen, these edges being re-bent upon themselves, as shown in Fig. 5, and provided with cut-out or notched portions 26 and intermediate loops 27, through which, when the ends of the strip are interfitted together, a hinge member 28 may be inserted to serve the same purpose as that already described in the perfected construction of my belt. The present belt has been found to produce an entirely satisfactory product and be strong and safe even under the heavy tension to which such belts are subjected, while by my improved method the joint may be formed economically and conveniently without flattening the edges of the hinge portion, as is the case if the ends of the screen are first re-bent upon themselves and then notched out. In addition to these advantages I have been able to produce a sufficiently strong joint with a hinge structure which will readily pass over rolls of the diameter used, and which will not cause a stretching of the belt beyond the elastic limit of the screen.

Other forms may be employed embodying the features of my invention instead of the one herein explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. A woven wire belt consisting of a strip of woven wire screen cloth provided with rebent end portions, such end portions being fastened to said screen and being cut away to provide alternated interlocking hinges, and being provided with fastening means adjacent each such cut-out portion, and a removable fastening member pivotally securing said finger together.

2. A woven wire belt consisting of a strip of woven wire screen cloth provided with rebent end portions, such portions being rebent upon themselves twice to provide loops of double thickness in said ends and said loops being cut away to provide alternate interlocking hinges.

3. A woven wire belt consisting of a strip of woven wire screen cloth provided with rebent end portions, such portions being rebent upon themselves twice to provide loops of double thickness in said ends and said loops being cut away to provide alternate interlocking hinges, and a removable fastening member pivotally securing said hinges together.

4. The method of forming joints in wire screen which consists in forming two series of spaced apertures parallel to and adjacent the end thereof, bending said screen on a line intermediate said series of apertures whereby the apertures of one series will register with those of the other series, and rebending said screen on a line bisecting such registered apertures.

5. The method of forming joints in wire screen which consists in forming two series of spaced apertures parallel to and adjacent the end thereof, bending said screen on a line intermediate said series of apertures whereby the apertures in both series will be in registration, rebending the screen on a line bisecting such registered apertures, and securing said end of the screen and the first bent edge thereof to the screen proper.

6. The method of connecting the ends of a wire screen belt which consists of forming a series of spaced apertures parallel to and adjacent each such ends, the apertures of said series being staggered with respect to one another, bending each end of the screen on lines bisecting the series of apertures, securing the extremities of each end to the screen belt proper, placing such ends in juxtaposition whereby the projection provided between the apertures of one series will fall within the cut-away portion provided by the apertures of the other series, and weaving a fastening element between the loops provided by the bent portion of each such ends.

7. The method of forming joints in wire screen which consists in forming a series of spaced apertures adjacent the end thereof, bending the screen upon itself on a line bisecting such apertures, and securing the extremity of such rebent portion adjacent each of the openings provided by said apertures to the screen proper.

Signed by me, this 15th day of May, 1925.

ROGER W. DISBRO.